United States Patent [19]

Birkett et al.

[11] Patent Number: 4,493,876

[45] Date of Patent: Jan. 15, 1985

[54] CORROSION INHIBITION

[75] Inventors: Kevin Birkett; Edward G. Scovell, both of Manchester; Glyn R. John, Warrington, all of England

[73] Assignee: Imperial Chemical Industries PLC, London, England

[21] Appl. No.: 600,383

[22] Filed: Apr. 16, 1984

[30] Foreign Application Priority Data

May 4, 1983 [GB] United Kingdom ................ 8312211
Jan. 31, 1984 [GB] United Kingdom ................ 8402491

[51] Int. Cl.$^3$ ............................................. C09D 5/08
[52] U.S. Cl. ............................. 428/457; 106/14.15; 106/14.37; 427/384
[58] Field of Search ............... 106/14.15, 14.31, 14.37; 564/265; 427/384; 428/457

[56] References Cited

U.S. PATENT DOCUMENTS 4,020,105  4/1977  Ackerley et al. .................. 564/265
4,231,888  11/1980  Dalton .............................. 252/182

OTHER PUBLICATIONS

Polish Jour. of Chemistry, 54, pp. 1567–1571, (1980).

Primary Examiner—Lorenzo B. Hayes
Attorney, Agent, or Firm—Cushman, Darby and Cushman

[57] ABSTRACT

Corrosion inhibition of metals (especially iron, zinc, copper, tin and aluminium and in particular mild steel and the zinc surface of galvanized steel) is provided by treatment with an optionally substituted 2-hydroxy-5-alkylbenzaldoxime wherein the 5-alkyl group contains from 7 to 13 carbon atoms. The benzaldoxime may be applied directly or as a solution in an organic solvent or as an aqueous emulsion. The benzaldoxime may be formulated in a surface coating composition.

8 Claims, No Drawings

CORROSION INHIBITION

This invention relates to a process for the inhibition of corrosion of metals.

Various corrosion inhibitors are known, the majority of which are of the reservoir type and are included as additives to water, solvent or oil-based systems used in contact with the metal. Thus such inhibitors are included for example in boiler waters where they are continuously contacted with the surface to be treated.

Corrosion inhibitors which are applied to a metal surface and form a protective coating which does not need to be continuously replenished are also known, and zinc phosphate and chromate treatments are conventionally used for this purpose. However, such treatments provide only limited protection and may have adverse environmental implications.

Other agents, such as tannic acid, act as so called "rust converters" on application to an already rusted surface. However such agents generally have a limited effect in terms of the inhibition of further rusting.

According to the present invention there is provided a process for the inhibition of the corrosion of metals which comprises treating the metal with an optionally substituted 2-hydroxy-5-alkylbenzaldoxime wherein the 5-alkyl substituent contains from 7 to 13 carbon atoms.

The 5-alkyl substituent may be linear or branched, saturated or unsaturated. Branched alkyl groups are especially preferred.

As optional substituents in the benzene ring of the 2-hydroxy-5-alkylbenzaldoxime there may be mentioned for example alkyl, aryl, alkoxy and aralkyl groups and more preferably halogen or nitro groups.

The process of the present invention is especially suitable for the corrosion inhibition of iron, zinc, copper, tin and aluminium and in particular mild steel and the zinc surface of galvanised steel.

The metal may be treated directly with the benzaldoxime, although it is generally preferred to apply the benzaldoxime to the metal surface in the form of a solution in a suitable organic solvent or as an aqueous emulsion of the benzaldoxime or as an aqueous emulsion of a solution of the benzaldoxime in an organic solvent. The benzaldoxime may be used to provide a protective coating in its own right; or as as a metal pre-treatment before the application of a surface coating; or may be incorporated into a surface coating composition.

Conventional organic solvents may be used for the benzaldoxime and include for example alcohols, ethers, ketones and aliphatic and aromatic hydrocarbons. Especially preferred solvents are those having good wetting and drying properties and include for example ethanol, isopropanol, toluene, xylene, chloroform and 1,1,1-trichloroethane.

Aqueous emulsions of the benzaldoxime may be formed in conventional manner using conventional dispersants and surfactants, including non-ionic dispersants.

Preferably the metal is treated with the benzaldoxime and the treated surface is simultaneously or subsequently contacted with water to assist the formation of a protective complex between the metal and the benzaldoxime. Thus when the benzaldoxime is used directly or as a solution in an organic solvent, the metal surface may be contacted subsequently with liquid water for a period sufficient for the complex between the metal and the benzaldoxime to be developed, for example from one to four hours. Water vapour in the atmosphere may also be used, and in this case the protective complex may take several days to be fully developed. In general the formation of the protective complex in the presence of water or water vapour will take place in preference to the rusting process, and there is thus no particular disadvantage if the protective complex builds up over a period of time.

It may be convenient to treat the metal with an aqueous emulsion of the benzaldoxime, since the treatment with the benzaldoxime and the contacting with water may then take place simultaneously, and a protective coating may be formed during contact times may be as short as one to five minutes. Liquid benzaldoximes which can be formed directly into an emulsion are especially preferred, for example a liquid, optionally substituted 5-alkyl-2-hydroxy benzaldoxime wherein the 5-alkyl group contains less than 14 carbon atoms.

The process of the present invention may provide corrosion inhibition either without the application of a further surface coating or as a pre-treatment before the application of a further surface coating. Thus the treatment may be used for example as a temporary protection whilst the metal is being transferred from one site to another. If desired, the protective complex between the metal and the benzaldoxime may be removed by treatment with a suitable solvent, for example one of the solvents mentioned above. Thus the process of the present invention may be used for the temporary protection of a metal surface and the protective coating subsequently dissolved before or during further processing.

Alternatively, the benzaldoxime may be formulated in a surface coating composition, for example a paint (primer), lacquer, resin or other protective coating. The surface coating may be a solvent-based composition, for example a cellulose/solvent based primer paint such as those used for car "touch up" paints. The benzaldoxime is soluble in solvents generally used for such primers (for example nitrocellulose) and may be incorporated directly. The benzaldoxime may also be used as an emulsion in aqueous emulsion surface coating systems, for example primers or protective coatings based on polymer latices such as for example acrylic and styrene/acrylic latices and vinyl acrylic co-polymer latices including acrylate modified vinyl chloride—vinylidene chloride copolymer latices. The benzaldoxime may also for example be incorporated in temporary alkali-removable protective coatings (whether solvent-based or emulsion-based) of the addition polymer type in which the polymer contains carboxyl groups.

The benzaldoxime or the solution or emulsion thereof may be applied to the metal in conventional manner, for example by dipping, spraying or brushing. The temperature of the application may be from 0 to 50° C, although faster formation of the protective coating may take place at the higher range of temperatures, for example 25 to 50° C. Typically, solutions of the benzaldoxime may contain from 0.1 to 10% by weight of benzaldoxime, whilst emulsions preferably contain from 0.1 to 5% by weight of benzaldoxime. The presence of from 0.1 to 2% by weight of the benzaldoxime in a surface coating emulsion formulation is generally sufficient to provide improved corrosion inhibition.

The metal to be treated may be brightly polished and/or freshly cleaned, but it is an advantageous feature of the process of the present invention that effective corrosion inhibition may be obtained even on a lightly rusted surface. Indeed we have found that better results are in general achieved when a surface is treated in an "as received" condition than when that same surface is freshly cleaned or brightly polished.

The process of the present invention may be combined with conventional corrosion inhibition treatments such as the phosphating of iron, and very effective corrosion inhibition is obtained when the process of the present invention is applied to a phosphated iron surface.

Whilst the scope of the present invention is not to be taken as being limited by any one particular theory, it is believed that the procass of the present invention leads to the formation of a chemically bound complex between the benzaldoxime and the metal/metal oxide surface, thereby providing the corrosion inhibition. In the treatment of iron, the formation of the complex may be monitored by the development of a violet colouration on the surface. In the treatment of zinc and galvanised steel, the complex is colourless and the treatment is therefore visually unobtrusive.

As indicated above, the process of the present invention is equally effective on lightly rusted iron surfaces, and may be used in this context as a "rust converter". We have found that the process of the present invention generally provides improved protection as compared with conventional "rust converters" based on tannic acid.

Improved corrosion inhibition is obtained when the complex between the metal surface and the benzaldoxime is stable and insoluble in water or dilute acidic or saline compositions such as may be encountered on exposure to the atmosphere. We have found that optionally substituted 5-alkyl-2-hydroxybenzaldoximes wherein the 5-alkyl group contains 7 or more carbon atoms are especially suitable for this purpose. Especially suitable 5-alkyl groups which show excellent corrosion inhibition against water and dilute acidic and saline atmospheres include heptyl, octyl, nonyl and dodecyl. The 5-nonyl group shows especially good protection against acidic and saline atmospheres.

The invention is illustrated by the following Examples in which all parts and percentages are by weight unless otherwise stated.

EXAMPLE 1

Bright mild steel 1 inch × 1 inch coupons were thoroughly washed with acetone followed by ethanol and stored in kerosene until required. Immediately prior to use they were washed in acetone.

A test coupon prepared as above was immersed in a 5% solution of 5-nonyl-2-hydroxybenzaldoxime in ethanol and then transferred to distilled water. A control coupon prepared in the same manner, but not treated with the benzaldoxime, was similarly immersed in distilled water. After 20 days, the test coupon had developed a violet-brown colouration with only a slight trace of tarnishing. A weight loss of 0.001% was recorded. In contrast, the control coupon was heavily rusted over its entire surface, and the weight loss was recorded as 0.55%.

EXAMPLE 2

The procedure of Example 1 was repeated except that 5-dodecyl-2-hydroxybenzaldoxime was used as the corrosion inhibitor. The test coupon and control coupon were immersed in distilled water for 8 days after which the test coupon showed no rusting and no weight loss could be detected. The control coupon was heavily rusted and a weight loss of 0.22% was recorded.

EXAMPLE 3

The procedure of Example 1 was repeated except that 5-nonyl-3-bromo-2-hydroxybenzaldoxime was used as the corrosion inhibitor. The test coupon and control coupon were immersed in distilled water for 8 days after which the test coupon showed no rusting and no weight loss could be detected. The control coupon was heavily rusted and a weight loss of 0.23% was recorded.

Example 4

Bright mild steel coupons were treated with a 5% ethanolic solution of 5-nonyl-2-hydroxybenzaldoxime as described in Example 1, and were exposed to the atmosphere for four weeks. During this time, the surfaces directly exposed to the weather developed a violet brown colouration. At the end of the four weeks very little rusting had occurred. In contrast, a control coupon which was not treated with the benzaldoxime had rusted heavily after only one week, whilst a control coupon which had received a conventional treatment with zinc chromate was also extensively rustad after four weeks.

EXAMPLE 5

Bright mild steel coupons were treated with a 5% ethanolic solution of 5-nonyl-2-hydroxybenzaldoxime as described in Example 1, and were fully immersed in 18% w/v hydrochloric acid at room temperature. After 5 hours immersion, some signs of attack were visible, and the weight loss was found to be 0.04%. However, a control coupon which was not treated with the benzaldoxime was found to have undergone very deep surface attack with an associated weight loss of 2.0%.

EXAMPLE 6

Bright mild steel coupons were treated with a 5% ethanolic solution of 5-nonyl-2-hydroxybenzaldoxime as described in Example 1, and were fully immersed in a 3% aqueous salt solution. After 7 days, the coupons had developed a violet-brown colour, which after washing with water followed by acetone, revealed a bright shining surface similar in appearance to the original coupon. Little corrosion was observed, and the weight loss was only 0.05%. In contrast untreated coupons rapidly became tarnished and average weight losses were 0.26%.

EXAMPLE 7

Galvanised steel coupons were treated with a 2% ethanolic solution of 5-nonyl-2-hydroxybenzaldoxime using the method described in Example 1, and were fully immersed in distilled water. After 7 days at room temperature, the coupons showed only slight signs of white rusting and the weight loss was only 0.02%. In contrast, coupons which were not treated with benzaldoxime showed heavy deposits of white rust and were deeply etched. Weight losses for untreated coupons were typically 0.3%.

EXAMPLE 8

A rusty steel girder was lightly brushed to remove loose rust and one section was treated by applying a 10% by weight solution of 5-nonyl-2-hydroxybenzaldoxime in 1,1,1-trichloroethane from a brush. A further section of the girder was treated in a similar fashion using a 10% by weight solution of tannic acid in water. The girder was exposed to the elements on an open roof. The section treated with the benzaldoxime developed a dark surface coating over a period of about two days and showed no further sign of corrosion over the test period of two months. The section of the girder treated with tannic acid formed a black coating within minutes, but further rusting could be clearly seen within one week. The portion of the girder treated with the benzaldoxime still showed no further sign of corrosion when exposed to the elements for an additional three months.

EXAMPLE 9

5-nonyl-2-hydroxybenzaldoxime was added at a concentration of 1% by weight to a number of commercially available cellulose-based primer paints sold as car "touch up" paints. After thorough mixing, the paint containing the benzaldoxime was applied by brushing to the surface of a mild steel coupon and allowed to dry overnight. A control sample using the unmodified paint was prepared in the same manner. The test sample and control were both scratched with a large cross to penetrate the paint film and were fully immersed in a 3% aqueous salt solution for three days.

On removal and examination of the coupons it was seen that in each case the coupon that was treated with the paint containing the benzaldoxime showed signs of rusting only within the confines of the scratched cross. In contrast, the coupon treated with the unmodified paint showed extensive rusting not only within the scratched cross but well into (and under) the surrounding painted region. In the case of some of the commercially available cellulose-based primer paints tested, the adhesion of the paint film to the coupon was destroyed over large areas adjacent to the scratched cross.

EXAMPLE 10

Commercial steel "chain wire" of 19 mm diameter was obtained having three treatments:

(A) annealed and pickled by the manufacturer;
(B) annealed, pickled and treated with zinc phosphate by the manufacturer; and
(C) annealed and pickled and subsequently having applied an oil coating of the type used by the manufacturer (coating thickness 3.7 microns; oil density 0.889 g/l at 20° C; and coverage 269 $m^2/1$).

Samples of (A) and (B) were treated with solutions of 5-nonyl-2-hydroxybenzaldoxime in 1,1,1-trichloroethane at various concentrations and were compared with untreated control samples and samples of (C). All samples were directly exposed to the elements on an open roof during adverse weather in the winter months. The results obtained are given in the following table:

| Sample | Concentration of Aldoxime in solvent (% by weight) | Number of days to first showing of rust |
| --- | --- | --- |
| A | — | <1 |
| A | 2.5 | 21 |
| A | 5.0 | 30 |
| B | — | <3 |
| B | 2.5 | 30 |
| B | 5.0 | >40* |
| C | — | 7 |

*No sign of rusting on termination of the test after exposure to the elements for 40 days and 40 nights.

EXAMPLE 11

Samples of copper foil (0.1 mm thickness) were cleaned by solvent rinsing or by a short nitric acid wash, and were treated with a 2% ethanolic solution of 5-nonyl-2-hydroxybenzaldoxime. All samples were exposed to the weather on an open roof for 7 weeks. During this period, the surface developed a slight yellowish tint, but no tarnishing occurred. The sample was then washed with acetone to remove the surface treatment, and the surface of the copper foil was once more revealed in its original bright state. No difference was detected between samples which were prepared by solvent washing and samples which were prepared by cleaning with a nitric acid wash.

By way of comparison, untreated copper foil became heavily tarnished within a matter of hours, whilst copper foil treated with a known anti-corrosion agent, benztriazole suddenly developed heavy tarnishing after 8 days exposure.

EXAMPLE 12

A 2 inch×2 inch coupon of a typical aluminium alloy BS L70 (Cu 4.4%, Mg 0.5%, Si 0.7% and Mn 0.8%) was treated with a 2.5% ethanolic solution of 5-nonyl-2-hydroxybenzaldoxime and then fully immersed in a 1% aqueous salt solution for 4 weeks. During this time the treated surface developed a slightly green tint. The surface treatment was then removed by washing with acetone and the original bright surface was revealed. No sign of corrosion/pitting was visible.

In contrast, a control coupon which was not treated with the aldoxime became dull and off-white and after immersion in the salt solution for 4 weeks exhibited severe pitting.

EXAMPLE 13

A tinned steel coupon (0.5 g/mz tin) was treated with a 2% ethanolic solution of 5-nonyl-2-hydroxybenzaldoxime. A commercially available epoxy lacquer was then applied and cured in an oven at about 200° C for 10 minutes. A large cross was scratched through the hardened lacquer film and the coupon was placed in a salt spray cabinet for 24 hours. Areas in the vicinity of the cross developed a purple colouration, but filliform corrosion was negligible.

In contrast, a coupon of the same tinned steel which had received a conventional chromate treatment prior to application of the lacquer showed very extensive filliform corrosion in the vicinity of the cross after exposure in the salt spray cabinet for 24 hours.

EXAMPLE 14

5-nonyl-2-hydroxybenzaldoxime was added at a concentration of 5% by weight to a solution of acrylic polymer in industrial methylated spirit at 16% solids. After thoroughly mixing, the polymer mix containing the benzaldoxime was applied by brushing to the surface of a mild steel coupon and allowed to dry and harden for several hours. A control sample using the acrylic polymer solution but no benzaldoxime was prepared in a similar manner. Both the test sample and the control were scratched with a large cross to penetrate the coatings and then fully immersed in distilled water for seven days.

On removal and examination of the coupons, it was seen that the coupon that was treated with the polymer containing the benzaldoxime showed slight signs of rusting within the confines of the scratch only. In contrast, the control coupon that had been treated with unmodified polymer showed heavy rusting due to under-film attack emanating from the scratch as well as comprehensive film breakdown.

EXAMPLE 15

A mild steel coupon was treated with the acrylic polymer solution containing 2-hydroxy-5-nonylbenzaldoxime as described in Example 14 and was exposed to the elements on an open roof alongside a control coupon having an acrylic coating not containing the benzaldoxime. Upon examination after 4 weeks exposure, the test sample that had received treatment with the polymer solution containing the benzaldoxime showed little sign of rusting, except for a few rust spots within the scratch. In contrast, the control coupon was heavily rusted within the scratch and in neighbouring areas indicating under-film attack. In addition, extensive spotting had occurred at the surface, indicating that the polymer film was breaking down.

We claim:

1. A process for the inhibition of corrosion of metals selected from the group consisting of iron, zinc, copper, tin and aluminium which comprises treating the metal with a 2-hydroxy-5-alkylbenzaldoxime wherein the 5-alkyl substituent contains from 7 to 13 carbon atoms and wherein the benzaldoxime ring is unsubstituted or carries a substitutent selected from the group consisting of halogen and nitro.

2. A process according to claim 1 wherein the metal is mild steel or the zinc surface of galvanised steel.

3. A process according to claim 1 wherein the 5-alkyl substituent is selected from the group consisting of heptyl, octyl, nonyl and dodecyl.

4. A process according to claim 1 wherein the benzaldoxime is applied to the metal surface in the form of a solution in an organic solvent 5. A process according to claim 4 wherein the solution contains from 0.1 to 10% by weight of the benzaldoxime.

6. A process according to claim 1 wherein the benzaldoxime is applied to the metal surface in the form of an aqueous emulsion of the benzaldoxime or as an aqueous emulsion of a solution of the benzaldoxime in an organic solvent.

7. A process according to claim 6 wherein the aqueous emulsion contains from 0.1 to 5% by weight of benzaldoxime.

8. A process according to claim 1 wherein the benzaldoxime is formulated in a surface coating composition.

* * * * *